Dec. 10, 1929.  J. GREGORICH  1,739,302
FEED REPULPER FOR SEDIMENTATION APPARATUS
Filed July 21, 1927
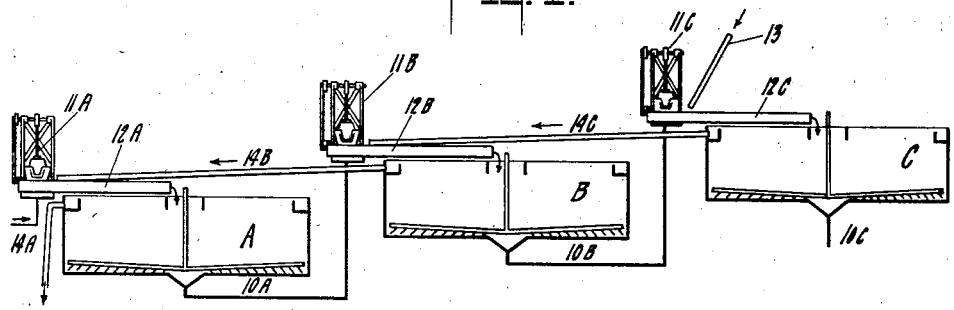
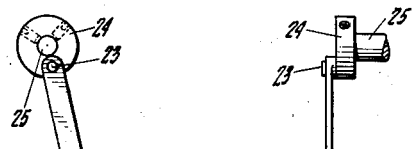
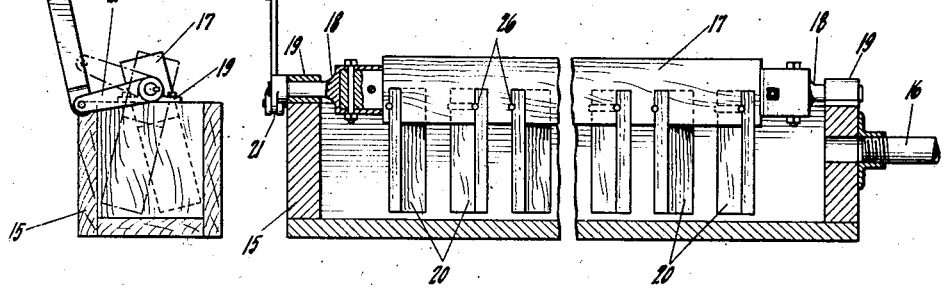
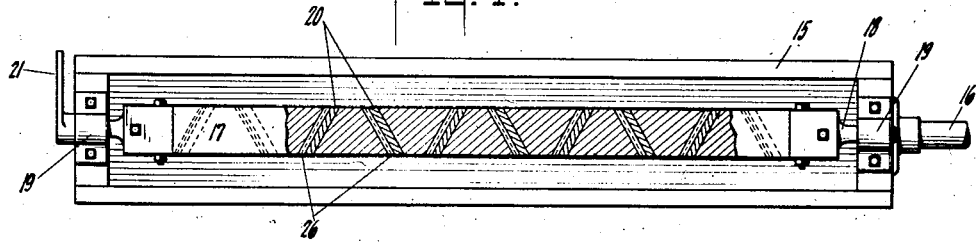
INVENTOR
James Gregorich
BY
Geo. G. Hyde
His ATTORNEY Patented Dec. 10, 1929

1,739,302

UNITED STATES PATENT OFFICE

JAMES GREGORICH, OF JOLIET, ILLINOIS, ASSIGNOR TO THE DORR COMPANY, OF NEW YORK, N. Y., A CORPORATION OF DELAWARE

FEED REPULPER FOR SEDIMENTATION APPARATUS

Application filed July 21, 1927. Serial No. 207,553.

This invention relates to improvements particularly applicable to continuous sedimentation systems, and is especially directed to an arrangement for handling combined solids and liquid comprising the feed to a sedimentation unit.

The invention has been developed in connection with the continuous countercurrent decantation system of sedimentation widely used for handling finely divided solids and liquid in a series of continuous settling and decantation steps. This system includes the use of a number of continuous sedimentation machines or thickeners, each adapted to overflow continuously the supernatant liquid and to discharge continuously in the form of a thick sludge the solids settling on the bottom. In operating this system the sludge or underflow from a thickener is pumped to the succeeding thickener, while the overflow passes to the preceding thickener. In such a system the solids will therefore pass through thickeners successively in one direction, while the liquid will pass through them successively in the opposite direction, an arrangement which is particularly useful either for washing the solids or for treating the solids efficiently with the liquid. The feed to each thickener in the series, except the first and the last, consists of a mixture of the sludge from the preceding thickener and the supernatant liquid from the succeeding thickener, these components being ordinarily combined at the discharge outlet of the sludge pump located at the edge of the thickener, and forming a suitably homogeneous mixture during flow through a suitable channel to the center of the thickener, it being necessary to feed such thickeners adjacent the center to prevent the solids from passing out with the liquid overflowing around the periphery of the apparatus.

In usual practice the thickeners are arranged so that the supernatant liquid will flow by gravity through the series, which makes it necessary to provide sufficient difference in elevation between adjacent thickeners not only to permit the supernatant liquid to flow to the pump discharge but also to provide a sufficient drop from the pump discharge to the feed discharge point at the center of the thickener so that the mixed sludge and liquid will flow continuously without depositing solids on the bottom of the channel. In many installations a rather sharp slope in the feed channel is required; and this slope adds very materially to the difference in elevation required between adjacent thickeners.

Furthermore, it is in some instances impossible to obtain the necessary uniform mixing of the sludge and liquid during the flow from the pump to the feed outlet, even where baffles or the like are employed. It has heretofore been the practice under such circumstances to discharge the sludge and liquid into a separate mixing tank to furnish proper thickener feed. This obviously adds materially to the expense of installation and operation.

The general objects of this invention are, first, to provide an arrangement which will adequately mix the sludge and liquid during continuous flow from the pump discharge to the feed region at the thickener center; and second, to utilize an arrangement of this type to reduce materially or eliminate entirely the slope required in the feed passage, reducing correspondingly the necessary difference in elevation of adjacent thickeners with a substantial saving in the cost of substructure and in the head room required for a long series of thickeners.

An arrangement has furthermore been worked out that is applicable with a minimum of alteration to present installations, particularly since the device is arranged to be operated by the drive of the pump which discharges sludge into it, so that no special driving arrangements are needed. Furthermore, the construction illustrated is particularly adapted for use in chemical processes or others where corrosive materials are encountered, as there are no bearings or wearing parts beneath the liquid level, and the parts coming in contact with the liquid or sludge may readily be made of wood or other resistant material.

Other objects and advantages, including the simplicity and strength of the arrangement shown, will be apparent from the following description taken in connection with the accompanying drawings in which Fig. 1 is a diagrammatic view of part of a countercurrent decantation series of thickeners with the invention applied thereto;

Fig. 2 is an end elevation of the mixing trough and drive;

Fig. 3 is a side elevation of same with the trough in central vertical section, parts being broken away; and Fig. 4 is a plan view of same with parts broken away.

The thickener series shown in Fig. 1 comprises continuous Dorr thickeners A, B and C provided with mechanism for continuously supplying settled solids in the form of sludge to the underflow lines 10A, 10B and 10C. Pump 11C withdraws the sludge through line 10B and discharges it into the mixing conveyer or repulper 12C, into which a suitable liquid such as wash water is also introduced through pipe 13 adjacent the discharge from pump 11C. The repulper 12C discharges the combined liquid and sludge into thickener C adjacent the center.

The overflow from thickener C passes through pipe line 14C into the repulper 12B adjacent the discharge of pump 11B which draws the sludge through line 10A and discharges it into the repulper 12B, from which, after mixture with the liquid, it passes continuously into thickener B near the center thereof.

In the same way the overflow from thickener B passes through pipe 14B into the repulper 12A adjacent the discharge of pump 11A, fed from a preceding step in the same series, and the overflow from thickener A is discharged through pipe 14A. As the various arrangements for employing a countercurrent decantation series in different types of flowsheets are well known to those skilled in the art, only the end of a conventional series of this type is illustrated.

The repulper comprises generally an arrangement adapted to provide mechanical agitation in a trough through which the sludge and liquid flow continuously, arranged to prevent building up of solids on the bottom of the channel and to produce a substantially homogeneous mixture of solids and liquid by the time the components reach the point of discharge. A convenient arrangement for this purpose includes a channel of the trough type with continuous agitating means mounted on a shaft running along the trough. This device may be of the oscillating type as in the form illustrated, in which the repulper comprises a trough 15 having a discharge outlet 16 at one end, this outlet being located if desired above the level of the trough bottom. The agitating device consists of a beam 17 mounted longitudinally above the trough center by means of trunnions 18 in bearings 19 an the ends of the trough 15. A series of blades 20 mounted on the beam 17 extends downwardly to a point adjacent the trough bottom; and the blades may be set alternately at opposite angles to the beam axis.

The agitating device may readily be operated by the drive of the sludge pump, which is located at one end of the repulper. In the form shown means is provided for imparting an oscillating motion to the beam 17 and blades 20, preferably by a connection to the drive of a sludge pump positioned to discharge into the feed end of the trough 15. This may be conveniently accomplished by mounting rocker arm 21 on trunnion 18 and connecting said arm by adjustable pitman 22 with a crank pin 23 on collar 24 mounted on the pump drive shaft 25.

In operation the connection directly to the pump drive is advantageous because an increase in pump speed will automatically cause a corresponding increase in the rate of agitation produced by the oscillation of beam 17. The bearings 19 are above pulp level, and the beam 17 and blades 20 may if desired be made of wood, the blades being removably mounted in suitable slots in the beam 17 as by pins 26.

While a preferred arrangement, which has the advantage of simplicity and suitability for the duties required, has been illustrated, the invention is not specifically limited thereto, but includes such other agitating or mixing devices suitable for the purpose described as fall within the scope of the claims.

I claim:

1. Continuous sedimentation apparatus comprising in combination a settling tank, means for continuously withdrawing supernatant liquid therefrom, a feed channel discharging into the tank at a point spaced from the zone of liquid withdrawal, means for feeding finely divided solids and liquid into the channel, and positively actuated mechanical mixing means in the channel for maintaining the solids in suspension during flow along said channel.

2. Continuous sedimentation apparatus comprising in combination a settling tank, means for continuously withdrawing supernatant liquid therefrom, a feed channel discharging into the tank at a point spaced from the zone of liquid withdrawal, a pump adjacent an end of the channel positioned to feed finely divided solids into the channel, means for feeding liquid into the channel adjacent the point of pump discharge into same and positively actuated mechanical mixing means in the channel for maintaining the solids in suspension during flow along said channel.

3. Continuous sedimentation apparatus comprising in combination a settling tank, means for continuously withdrawing supernatant liquid therefrom, a feed channel discharging into the tank at a point spaced from the zone of liquid withdrawal, a pump adjacent an end of the channel positioned to feed finely divided solids into the channel, means for feeding liquid into the channel adjacent the point of pump discharge into same, pump actuating means, and means for driving the mixing means from said pump actuating means.

4. Continuous sedimentation apparatus comprising in combination a settling tank, means for continuously withdrawing supernatant liquid therefrom, a feed trough discharging into the tank, means for feeding finely divided solids and liquid into the trough adjacent an end thereof, a shaft extending longitudinally above the trough, blades carried by the shaft extending into the trough adjacent the bottom thereof, and means for continuously actuating the shaft to impart transverse movement to the blades adapted to maintain the solids in suspension in the liquid during flow along the trough.

5. Continuous sedimentation apparatus comprising in combination a settling tank, means for continuously withdrawing supernatant liquid therefrom, a feed trough discharging into the tank, means for feeding finely divided solids and liquid into the trough adjacent an end thereof, a shaft extending longitudinally above the trough, blades carried by the shaft extending into the trough adjacent the bottom thereof, and means for oscillating the shaft to impart to the blades a transverse reciprocating movement in the trough adapted to maintain the solids in suspension in liquid during the flow along the trough.

6. Continuous sedimentation apparatus comprising in combination a settling tank, means for continuously withdrawing supernatant liquid therefrom, a feed trough discharging into the tank, an agitator shaft extending longitudinally above the trough, agitating members mounted on the shaft and extending into the trough, a pump adjacent the trough and discharging into same, a drive shaft for the pump substantially parallel to the agitator shaft, and means for actuating the agitator shaft driven from the pump drive shaft.

7. Continuous sedimentation apparatus comprising in combination a settling tank, means for continuously withdrawing supernatant liquid therefrom, a feed trough discharging into the tank, agitating means in the trough, a pump adjacent the trough and discharging into same, pump drive means, and means actuated thereby to impart an oscillating movement to the agitating means.

8. Continuous sedimentation apparatus comprising in combination a settling tank, means for continuously withdrawing supernatant liquid therefrom, a feed trough discharging at one end into the tank, a pump located adjacent to and discharging into the opposite end of the trough, an agitator shaft mounted on the trough and extending longitudinally above same, agitating means carried by the shaft extending into the trough, a drive shaft for the pump, and means for actuating the agitator shaft from said drive shaft.

9. Continuous sedimentation apparatus comprising in combination a series of settling tanks, means for withdrawing supernatant liquid from each tank except the first and conveying same to a mixing point for feed to the succeeding settling tank in the series; and means for conducting the settled solids and supernatant liquid from the mixing point for a settling tank in the series to a point of discharge into said tank, said conducting means including positively actuated mechanical agitating means adapted to maintain the solids in suspension in the liquid.

10. Continuous sedimentation apparatus comprising in combination a series of settling tanks, means for withdrawing supernatant liquid from each tank except the first and conveying same to a mixing point for feed to the preceding settling tank in the series; means for withdrawing settled solids from each tank except the last and conveying same to a mixing point for feed to the succeeding settling tank in series, said solids withdrawing means including a sludge passage and a sludge pump connected thereto located adjacent the margin of said succeeding tank; and means for conducting the settled solids and supernatant liquid from the mixing point for a settling tank in the series to a point of discharge into said tank, the conducting means including a channel positioned to receive the discharge from the sludge pump at said mixing point and the liquid conveyed to said point and positively actuated mechanical agitating means in said channel.

11. Continuous sedimentation apparatus comprising in combination a series of settling tanks, means for withdrawing supernatant liquid from each tank except the first and conveying same to a mixing point for feed to the preceding settling tank in the series; means for withdrawing settled solids from each tank except the last and conveying same to a mixing point for feed to the succeeding settling tank in the series, said solids withdrawing means including a sludge passage and a sludge pump connected thereto located adjacent the margin of said succeeding tank; and means for conducting the settled solids and supernatant liquid from the mixing point for a settling tank in the series to a point of discharge into said tank, said conducting means including a trough having one end adjacent the sludge pump at said mixing point positioned to receive the discharge from said pump; an agitator shaft extending longitudinally above the trough and mounted thereon; agitating members on the shaft extending into the trough; and common drive means for the pump and agitator shaft.

12. Feeding apparatus for sedimentation tanks having an overflow for supernatant liquid, comprising a channel adapted to extend from the margin of a tank to a feed zone at a distance from the overflow thereof; agitating means mounted on the channel for movement transversely thereof adapted to prevent segregation of the feed components during continuous flow through the channel; and a driving connection for imparting to the agitating means a transverse movement in the trough.

13. Feeding apparatus for sedimentation tanks having an overflow for supernatant liquid comprising a trough adapted to extend from the margin of the tank to a feed zone at a distance from the tank overflow; an agitator shaft mounted longitudinally on the trough; agitating blades on the shaft extending into the trough adjacent the bottom thereof, and a driving connection adapted to impart to the blades transverse movement across the trough.

14. Feeding apparatus for sedimentation tanks having an overflow for supernatant liquid comprising a trough adapted to extend from the margin of the tank to a feed zone at a distance from the tank overflow; an agitator shaft mounted on the trough and extending longitudinally thereof; agitator blades on the shaft extending downwardly into the trough adjacent the bottom thereof, and a crank adapted to impart an oscillating movement to the shaft for reciprocating the blades transversely in the tank.

In testimony whereof I affix my signature.

JAMES GREGORICH.